Sept. 27, 1932.  F. S. LAWRENCE  1,879,346
CIRCUMFERENTIAL PIPE CUTTING OR WELDING MACHINE
Filed July 29, 1931  4 Sheets-Sheet 1
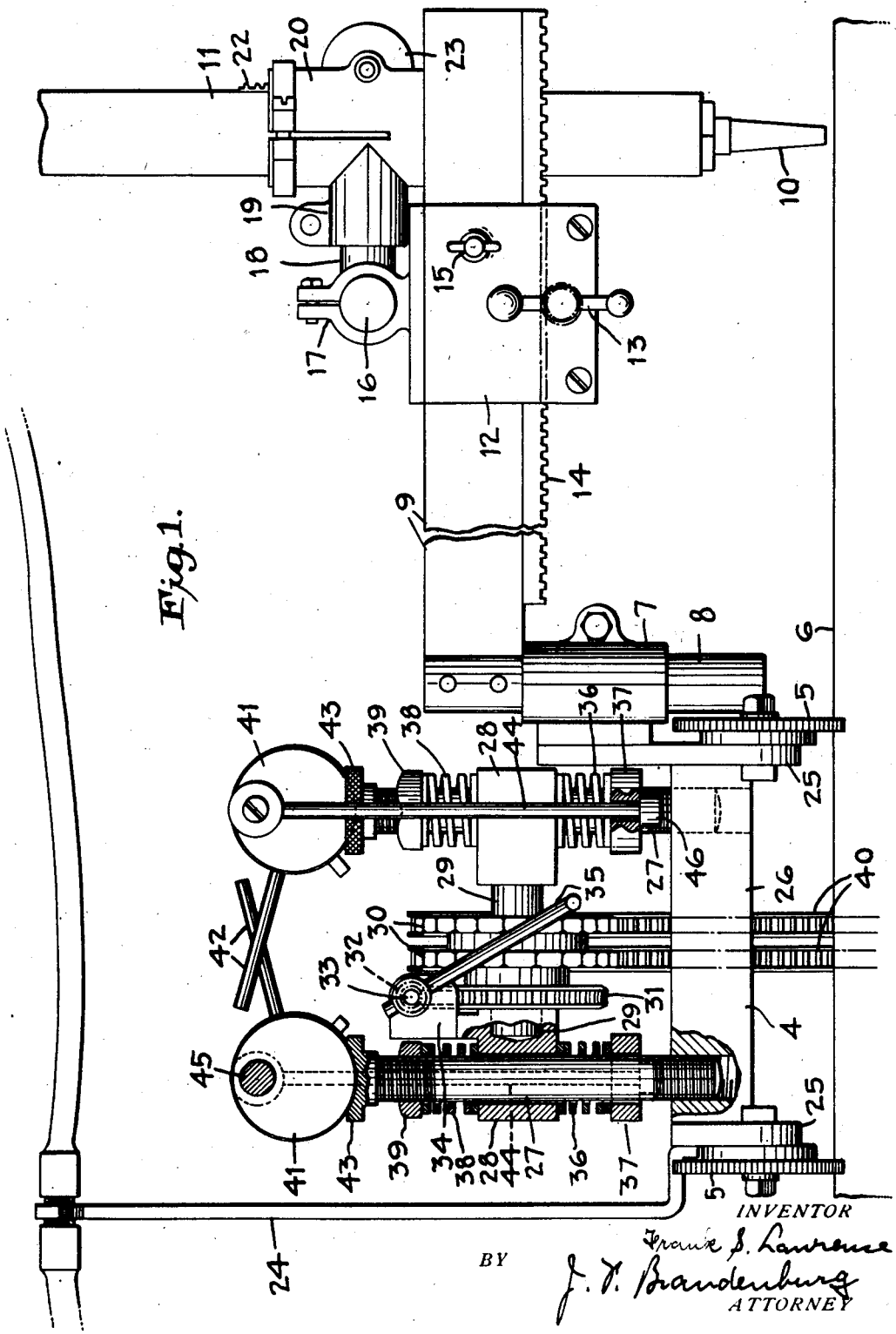

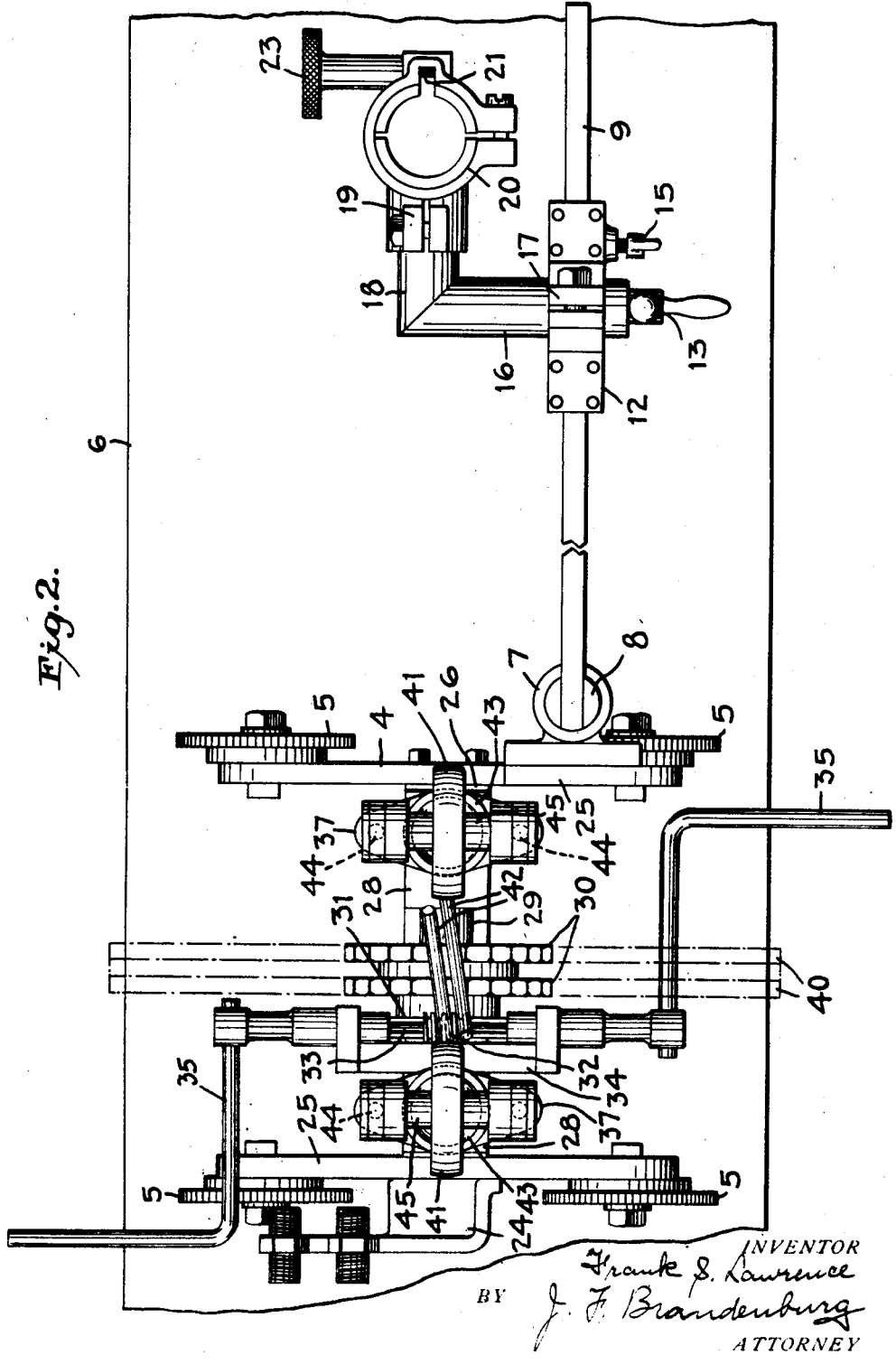

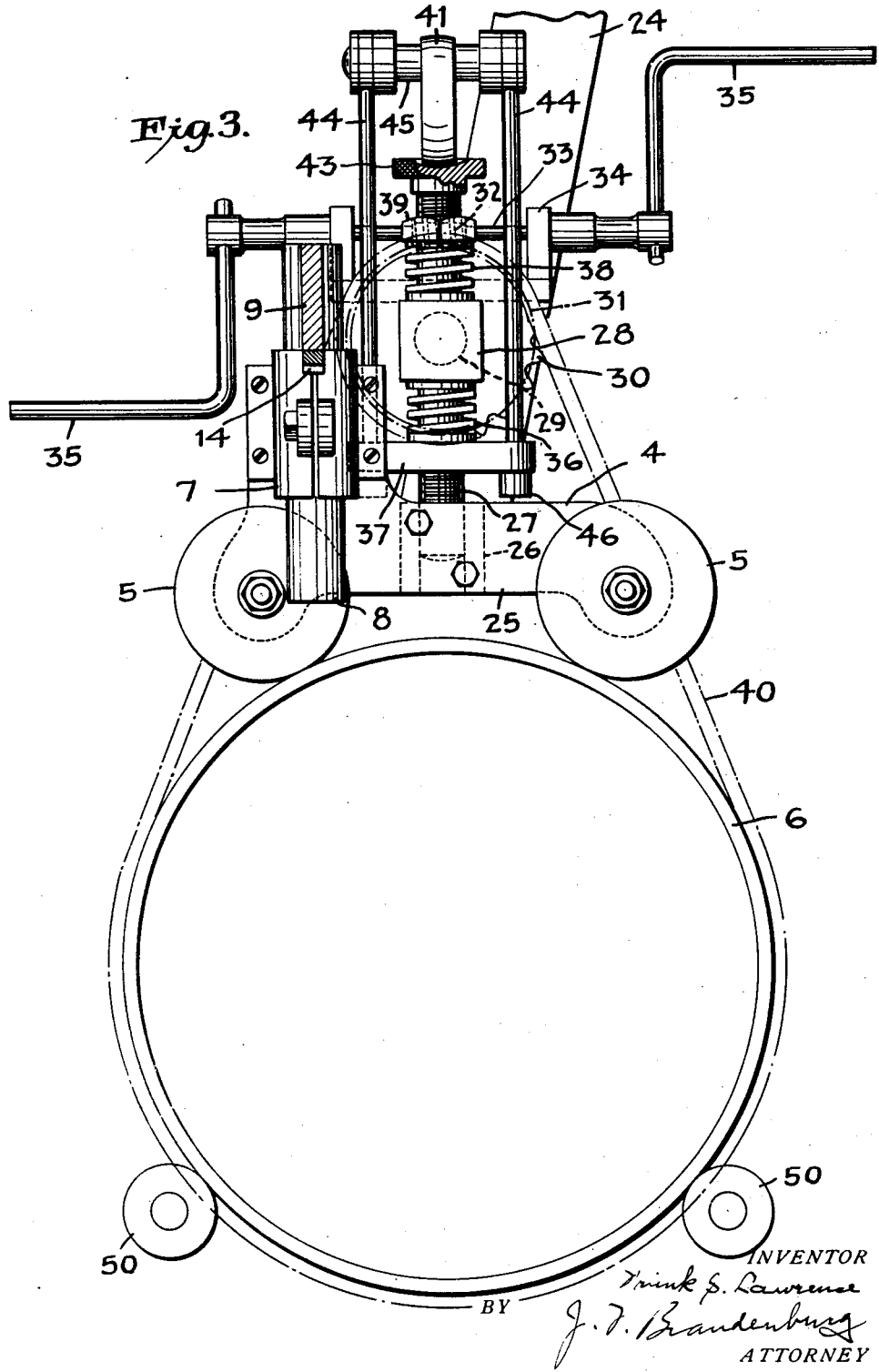

Sept. 27, 1932.  F. S. LAWRENCE  1,879,346
CIRCUMFERENTIAL PIPE CUTTING OR WELDING MACHINE
Filed July 29, 1931  4 Sheets-Sheet 4
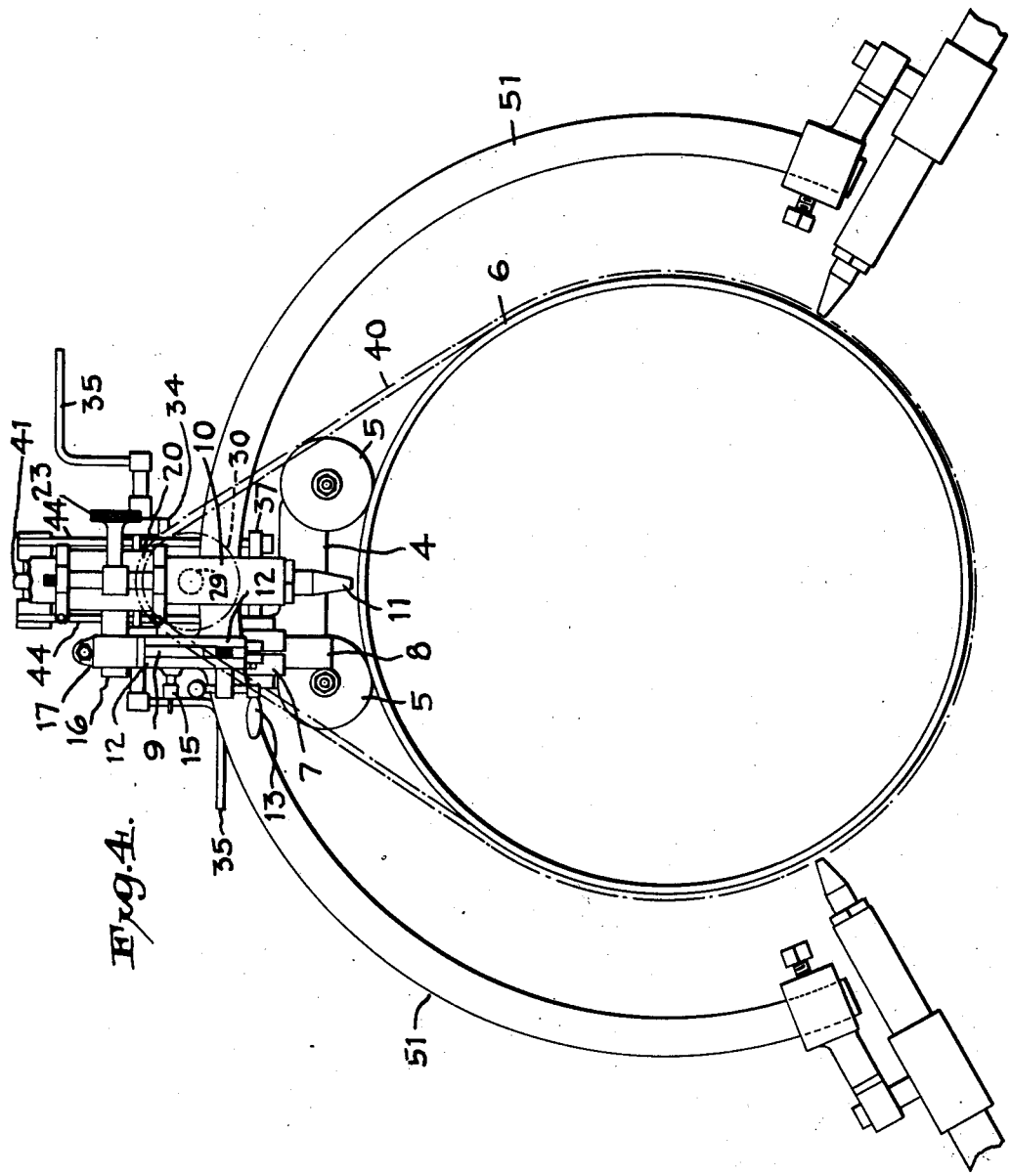
INVENTOR
Frank S. Lawrence
BY
J. F. Brandenburg
ATTORNEY Patented Sept. 27, 1932

1,879,346

UNITED STATES PATENT OFFICE

FRANK S. LAWRENCE, OF DUNELLEN, NEW JERSEY, ASSIGNOR TO AIR REDUCTION COMPANY, INCORPORATED, OF NEW YORK, N. Y., A CORPORATION OF NEW YORK

CIRCUMFERENTIAL PIPE CUTTING OR WELDING MACHINE

Application filed July 29, 1931. Serial No. 553,788.

The invention relates to the art of cutting or welding pipe or pipe sections circumferentially by means of torches or their equivalents.

Portable welding and cutting machines, which are affixed to the pipe, are known. These are usually, if not universally, of the rigid ring type, in which a divided annulus serves as a bearing or track for another ring or carrier bearing the torch. The object of this invention is to provide a simpler, cheaper, lighter and less expensive device, which can be applied to the pipe and removed more quickly and easily, and with which circumferential welding and cutting can be performed expedituously and with a high degree of perfection.

A further object is to provide a machine with which either the torch can be revolved about the pipe or the pipe can be rotated in relation to the torch. Another object is to provide a machine which is applicable to pipe of all diameters.

The machine is a simple torch carriage having at least three points of rolling support, to travel directly on the surface of the pipe, in combination with a flexible element, which holds the carriage to the pipe and acts as a guide, and which is preferably utilized as part of means for feeding the carriage around the pipe or for rotating the pipe relatively to the carriage. The flexible element might be a belt, but is preferably a sprocket chain, and the drive is preferably obtained by rotating a pulley, drum or sprocket-wheel, which is on the carriage and over which and around the pipe the flexible element is passed. In order to hold the carriage close to the pipe, for the purpose of continuous relative travel with the torch stably supported in definite relation to the circumference, a spring or springs are provided, preferably in connection with the sprocket or equivalent element on the carriage, for keeping the flexible element in tension. Quick-action devices for releasing and applying the tension facilitate the application and removal of the machine, or the shifting of it to a different position on the pipe.

Other objects and features of the invention will become apparent from a consideration of the preferred embodiment of the invention illustrated in the drawings and described in the body of the specification.

In the said drawings, which form part hereof:

Fig. 1 may be termed a front elevation, though since the illustrated machine can be driven in either direction, or can drive the pipe in either direction, terms such as front and rear or forward and backward, have no special significance. An intermediate portion of the torch-arm is broken out, and portions of the carriage are shown in section. The pipe is indicated.

Fig. 2 is a plan view, also showing the machine clasped to a pipe.

Fig. 3 is an end view of the pipe and a side elevation of the carriage, with the torch-arm in section and certain other portions partly sectioned or broken away.

Fig. 4 is an end view showing how a plurality of torches may be carried to operate in the same circuit.

The carriage frame 4 of the particular embodiment of the invention illustrated in the drawings has four wheels 5 to roll on the surface of the pipe 6.

Applied to one side of the carriage is an approximately perpendicular socket 7, in which a pivot post 8 is frictionally held in a manner permitting it to turn so that the horizontal torch-arm 9, which is fixed to its upper end, can be swung to different angular positions. The post and socket can also be utilized for perpendicular adjustment, by shifting the post up or down in the socket. The pivotal connection of the inner end of the torch-arm to the carriage affords a very convenient adjustment usable for bringing tip 10 of the torch 11 into a desired relation to the circumference of a pipe. The torch-arm may extend at right angles to the carriage, parallel with the axis of the pipe, but this is not necessarily the working position, since it is likely to be desirable to operate with the torch-arm disposed at some rearward inclination to this position, or even at a forward inclination. At the extreme, the torch-arm can be folded alongside the carriage, projecting more or less straight rearward, or for that matter, in a forward direction. Such a position of the torch-arm may be utilized for bringing the torch close to the zone of the carriage. The operator will place the torch-arm at such angularity as is best suited to the particular working conditions.

The various adjustments provided for the torch can be selected from the practice of the general art in such matters. Those illustrated are preferred for their simplicity and the universality of adjustment which they afford. A carrier 12 slidable along the torch-arm can be run in or out by turning a handle 13 connected with a pinion, which meshes a rack 14 on the lower edge of the arm. This adjustment can be set by a thumb-screw 15. A swivel adjustment for the torch on an approximately fore-and-aft axis is secured by clasping a trunnion 16 in a split socket 17 on the carrier 12, this adjustment being useful for making bevel cuts, for example. The trunnion 16 is preferably one limb of an L, the other cylindrical limb 18 of which is clasped by a split socket 19 on the torch-holder 20, thereby enabling the torch to be disposed perpendicular to the surface of the work or at forward (or rearward) inclination to the perpendicular. The torch itself can be adjusted "up or down" by a pinion 21 on the torch holder, this pinion meshing a familiar rack 22 on the torch and being operable by a knob 23.

Only one torch is shown in Figs. 1, 2 and 3 but obviously two or more torches can be carried to cut or weld circumferentially and simultaneously at different locations along the pipe, or to cooperate in various ways. Thus, the equipment for the machine may include two of the carriers 12, each carrying a torch and the adjustment devices which have been described, and such carriers with their torches can be adjusted relatively to each other along the arm 9. For example, two cutting torches can be employed in this manner to cut out an annular section from a pipe or pipe line.

A hose bracket 24 is fixed to the carriage 4, preferably at the side opposite from the torch arm. This bracket serves to carry the hose or other flexible energy-supply connections around the pipe with the torch or torches in a manner which prevents fouling, or the bracket can be used as a handle to keep the carriage stationary while the pipe is driven to cause its circumference to travel past the torch or torches.

An inexpensive yet sturdy frame for the carriage may be constructed of two side plates 25, carrying the wheels 5, united by a cross-piece 26. Two parallel posts 27, preferably screw threaded, are fixed at their lower ends in this cross-piece, and on these posts bearing blocks 28 are guided, the holes through these blocks being unthreaded. The ends of the shaft 29 of a double sprocket-wheel 30 are held in sockets of the blocks 28, and a worm-wheel 31 is united with the sprocket-wheel or to the same shaft. This worm-wheel is engaged by a worm 32, the driving shaft 33 of which is journaled in a bracket 34 fixed to one of the blocks. Crank handles 35 are preferably applied to both ends of the driving shaft, this being a convenience, as, for example, when the carriage is caused to travel around the pipe. Gearing of this character provides for relative propulsion at uniform speed between the torch and the circumference of the pipe by hand power, but manifestly a familiar motor drive may be employed if a more automatic and expensive machine should be desired.

The blocks 28 are sustained on springs 36 which encircle the posts 27, in confinement between the blocks and collars 37. Other springs 38 are preferably interposed between the tops of the blocks and tension adjustment nuts 39, which latter have threaded engagement with the posts.

A double sprocket-chain 40 is looped about the pipe and the sprocket wheel 30 and is kept under tension by the springs 36. This sprocket chain has, of course, means for fastening and unfastening its ends when the machine is applied to or removed from a pipe, and the same machine can be used on pipes of widely differing diameters by shortening or lengthening the chain or other flexible element, or by substituting flexible elements of appropriate lengths. The invention is not necessarily limited to the use of a sprocket-chain in order to provide an endless flexible element for holding the torch carriage to the pipe and permitting of the relative circumferential drive in a true path between the carriage and the pipe, and similarly the sprocket wheel is illustrative of the preferred form of engagement between the flexible guiding and securing element and the carriage.

Specifically, however, an endless loop of sprocket chain to serve as means for holding a torch carriage to pipe and for guiding or keeping the carriage in a true circular course, when either the carriage is revolved about the pipe or the pipe is turned relatively to the carriage, has a decided advantage, since it makes the apparatus so easily applied to pipe of different sizes by simply taking off or adding the proper number of chain links. Also, the multi-point bearing of the sprocket chain against the surface of the pipe not only resists circumferential slippage but also helps to prevent lateral deviation, that is to say any departure of the carriage, lengthwise of the pipe, from a plane or zone truly perpendicular to the pipe. It is somewhat remarkable that a carriage, which can be conceived of as traveling in a revolving sling, is kept by the spring pressure and the frictional engagement of the sling with the pipe to so definite a plane. Whether the carriage travels in an orbit or the pipe is rotated is, of course, purely relative, the effect of accurate guiding, without a rigid track or ring, being the same in either case.

In the preferred embodiment the flexible guiding and securing element is also employed as a part of the drive, since, as illustrated, the sprocket chain serves either as a track for the sprocket wheel, when the carriage revolves about the pipe, or as a driving element for rotating the pipe, when the pipe is free to turn and the carriage is kept in one place. However, the drive might be applied to the carrying wheels 5, given sufficient traction of the latter on the pipe surface, the wheels being shown as being knurled. On the whole, the most advantageous form of the invention is one in which the flexible element coacts directly with the drive, and the most advantageous form of the element is a chain engaging a toothed rotary element on the carriage.

A feature of the invention which decidedly increases the utility of the machine is the provision of means for quickly releasing, or relieving, the tension on the flexible element and for quickly restoring or applying the tension. Slackening the chain or permitting it to be applied in a slack condition makes it easy to fasten and unfasten its ends, and the quickness with which the chain can be slackened and tightened contributes materially to the speed of set up and removal and to the number of circumferential cuts or welds that can be made in a given period of time. The particular means shown in the drawings has special advantages, but it is to be understood as being illustrative since a variety of equivalent arrangements may be employed. In the illustrated construction the collars 37, constitute freely movable abutments for the tensioning springs 36, and these collars are sustained by cams or eccentrics 41 which can be turned by handles 42. The peripheries of the cams 41 bear in concavities of heads 43 of the posts 27 and are connected with the collars by pairs of links 44, the upper ends of these links being pivoted on the ends of pins 45 passed eccentrically through the cam discs, and their lower ends passing through holes in the collars 37, beneath which the links have enlargements 46. By turning the cams so that the collars 37 are lifted, the springs 36 are compressed to tighten the chain 40, whilst by tripping the cams the tension is as instantly relaxed.

The uses and manner of operation of the machine are briefly as follows:

The machine is placed with its carrying wheels 5 against the circumference of the pipe. The chain 40 is passed about the pipe and over the sprocket wheel 30, its ends are fastened, and the cams 41 are turned to take up slack in the chain and to compress the springs 36, so that the carriage and the pipe are bound firmly together but in a manner permitting the carriage to roll around the pipe as if in a revolving sling, or the pipe to be rotated relatively to the carriage. If the pipe is fixed or is allowed to remain stationary, operation of one or other of the handles causes the carriage to be propelled along the chain and around the pipe. If a pipe section, or two or more pipe sections preliminarily tacked together, are supported on rollers 50, the machine can be held stationary and the same operation of the drive on the carriage will turn the pipe so that its surface moves past the torch. The operator may combine the two operations by advancing the carriage for a distance over the top of the pipe and then, while continuing to turn the driving handle, pulling the machine toward him, so that the pipe and machine are turned bodily on cradle rollers 50, repeating this operation at intervals until the entire circuit has been cut or welded, the machine though traveling being always kept in a general location convenient to the operator. When the pipe or pipe line can not be turned the carriage will be driven all the way around the pipe.

The operation of cutting and welding torches being well understood, the action of the torch need not be specially described. The torch or torches carried by the machine may be cutting torches or welding torches or combined cutting and welding torches. Atomic hydrogen cutting devices or electric arc welding electrodes may be used in place of oxyacetylene or other gas torches and for the purpose of this invention may be considered as equivalents. Appropriate changes in holding and adjusting devices and accessory apparatus may be readily made.

Fig. 4 illustrates a plan for supporting a number of torches to act at equal distances about the circle of the pipe and in the same transverse plane or circuit. In this instance two supplementary arms 51 are shown applied to the carrier 12, these arms extending in opposite directions part way about the pipe and carrying additional torches in torch holders having appropriate adjustments. In cutting or welding large pipe the time required for the operation can be reduced by using two or more torches in this manner, so that the work is completed in the course of a partial revolution.

For the purpose of welding operations, various special types of welding torches may be employed and various provisions suitable for welding may be made.

Numerous other modifications in the embodiment and application of the invention will suggest themselves and are to be understood as being within the scope of the invention which is intended to be claimed in its generic and specific aspects in the appended claims.

I claim:

1. A circumferential pipe cutting or welding machine, comprising a torch-carriage, wheels supporting the torch carriage to travel on and around the surface of the pipe, means comprising a flexible element adapted to be passed about the pipe and in engagement with the carriage so as to hold the carriage to the pipe, and drive mechanism on the carriage for producing relative circumferential feed between the carriage and the pipe.

2. A circumferential pipe cutting or welding machine, comprising a torch-carriage adapted to travel on and around the surface of the pipe, means comprising a flexible element adapted to be passed about the pipe and in engagement with the carriage so as to hold the carriage to the pipe, resilient means to keep the flexible element in tension, and drive mechanism on the carriage for producing relative circumferential feed between the carriage and the pipe.

3. A circumferential pipe cutting or welding machine, comprising a torch-carriage adapted to travel on and around the surface of the pipe, means comprising a flexible element adapted to be passed about the pipe and in engagement with the carriage so as to hold the carriage thereto, and driving means on the carriage coacting with the flexible element to produce relative circumferential feed between the carriage and the pipe.

4. A circumferential pipe cutting or welding machine, comprising a torch-carriage having rolling supports to bear stably on the surface of the pipe while the carriage travels around the pipe or the pipe turns relatively to the carriage, a rotary element on the carriage, a flexible element adapted to be passed about this rotary element and about the pipe so as to hold the carriage thereto, and driving means on the carriage for producing relative circumferential feed between the carriage and the pipe.

5. A circumferential pipe cutting or welding machine, comprising a torch-carriage having rolling supports to bear stably on the surface of the pipe while the carriage travels around the pipe or the pipe turns relatively to the carriage, a rotary element on the carriage, a flexible element adapted to be passed about this rotary element and about the pipe so as to hold the carriage thereto, and driving means on the carriage connected with said rotary element so as to rotate the same in coaction with the flexible element and thereby produce relative circumferential feed between the carriage and the pipe.

6. A circumferential pipe cutting or welding machine, comprising a torch-carriage having rolling supports to bear stably on the surface of the pipe, a sprocket-wheel on the carriage, a sprocket-chain adapted to be passed about the sprocket-wheel and about the pipe so as to hold the carriage to the pipe, and means for rotating the sprocket-wheel.

7. A circumferential pipe cutting or welding machine, comprising a torch-carriage adapted to travel on and around the surface of the pipe, a rotary element on the carriage, a spring mounting for this rotary element, and a flexible element adapted to be passed about the pipe and said rotary element so as to hold the carriage to the pipe while the carriage is driven around the pipe or the pipe is rotated relatively to the carriage.

8. A circumferential pipe cutting or welding machine, comprising a torch-carriage having rolling supports to bear stably on the surface of the pipe, a sprocket-wheel on the carriage, spring-pressed bearings for said sprocket-wheel, a worm-wheel connected with the sprocket wheel, a driving worm engaging the worm-wheel, and a sprocket-chain adapted to be passed about the sprocket-wheel and the pipe.

9. A circumferential pipe cutting or welding machine, comprising a torch-carriage adapted to travel on and around the surface of the pipe, a rotary element on the carriage, a flexible element adapted to be passed about the pipe and said rotary element so as to hold the carriage to the pipe while the carriage is driven around the pipe or the pipe is rotated relatively to the carriage, spring means acting on the rotary element to keep the flexible element in tension, and means for releasing the tensional effect on the flexible element of the spring means.

10. A circumferential pipe cutting or welding machine, comprising a torch-carriage adapted to travel on and around the surface of the pipe, a rotary element on the carriage, a flexible element adapted to be passed about the pipe and said rotary element so as to hold the carriage to the pipe while the carriage is driven around the pipe or the pipe is rotated relatively to the carriage, spring means acting on the rotary element to keep the flexible element in tension, and a quick-action mechanism for releasing and restoring the tensional effect on the flexible element of the spring means.

11. A circumferential pipe cutting or welding machine, comprising a torch-carriage adapted to travel on and around the surface of the pipe, a rotary element on the carriage, a flexible element adapted to be passed about the pipe and said rotary element so as to hold the carriage to the pipe while the carriage is driven around the pipe or the pipe is rotated relatively to the carriage, spring means acting on the rotary element to keep the flexible element in tension, and cam means for releasing and restoring the tensional effect on the flexible element of the spring means.

12. A circumferential pipe cutting or welding machine, comprising a torch-carriage adapted to travel on and around the surface of the pipe, a rotary element on the carriage, a flexible element adapted to be passed about the pipe and said rotary element so as to hold the carriage to the pipe while the carriage is driven around the pipe or the pipe is rotated relatively to the carriage, a slidably guided mounting for said rotary element, springs acting on the sliding part of the mounting, movable abutments for said springs, and quick-action devices cooperating with said abutments.

13. A circumferential pipe cutting or welding machine, comprising a torch-carriage adapted to travel on and around the surface of the pipe, a pair of guides on the carriage, carriers slidable on said guides, a rotary element supported by and between said carriers, springs acting on said carriers, and a flexible element adapted to be passed about the rotary element and about the pipe.

14. A circumferential pipe cutting or welding machine, comprising a torch-carriage adapted to travel on and around the surface of the pipe, a pair of guides on the carriage, carriers slidable on said guides, a rotary element supported by and between said carriers, springs acting on said carriers, movable abutments for said springs, rods extending from said movable abutments, devices connected with said rods for moving the rods and abutments, and a flexible element adapted to be passed about the rotary element and about the pipe.

15. A circumferential pipe cutting or welding machine, comprising a torch-carriage adapted to travel on and around the surface of the pipe, a pair of guides on the carriage, carriers slidable on said guides, a rotary element supported by and between said carriers, springs acting on said carriers, movable abutments for said springs, manually operable cams at the heads of the guides, and rods connecting said cams with said abutments, and a flexible element adapted to be passed about the rotary element and about the pipe.

16. A circumferential pipe cutting or welding machine, comprising a torch-carriage adapted to travel on and around the surface of the pipe, a flexible element adapted to be passed about the pipe and a portion of the carriage to hold the carriage to the pipe, and driving means on the carriage for either feeding the carriage around the pipe or rotating the pipe relatively to the carriage.

17. A circumferential pipe cutting or welding machine, comprising a torch-carriage adapted to travel on and around the surface of the pipe, a flexible element adapted to be passed about the pipe and a portion of the carriage to hold the carriage to the pipe, driving means on the carriage for either feeding the carriage around the pipe or rotating the pipe relatively to the carriage, a torch-arm extending laterally from the carriage in the general direction of the length of the pipe, and a connection between said torch arm and the carriage enabling the torch arm to be swung forward or rearward.

18. A circumferential pipe cutting or welding machine, comprising a torch-carriage adapted to travel on and around the surface of the pipe, a flexible element adapted to be passed about the pipe and a portion of the carriage to hold the carriage to the pipe, driving means on the carriage for either feeding the carriage around the pipe or rotating the pipe relatively to the carriage, a torch-arm extending laterally from the carriage in the general direction of the length of the pipe, a carrier adjustable lengthwise of said arm, a connection fitting swiveled on said carrier on a fore and aft axis, and a torch holder swiveled on said fitting on an axis at right angles to the other axis.

19. In circumferential pipe cutting apparatus, the combination of a plurality of cutting torches, means for supporting said torches to act at substantially equal distances in a circle about the pipe, and feed means for producing relative circular motion between the pipe and the torch-supporting means, so that the circuit of the pipe will be cut as the result of a partial revolution.

20. A circumferential cutting or welding apparatus, comprising a stable carriage bearing a torch, a flexible member for holding the carriage to a round body, wheels rolling on the body and supporting the carriage, and a rotary member supported by the carriage and rolling on the flexible member.

21. A circumferential pipe cutting or welding machine including a torch carriage; a flexible element for surrounding the pipe to hold the carriage against the pipe; a member on the carriage over which the flexible element passes; and wheels supporting the carriage for movement on and around the surface of the pipe.

22. A circumferential pipe cutting or welding machine including a torch carriage; a flexible element for surrounding the pipe to hold the carriage against the pipe; a member on the carriage over which the flexible element passes; resilient means supporting said member for holding the flexible element taut; and wheels supporting the carriage for movement on and around the surface of the pipe.

23. A circumferential pipe cutting or welding machine, comprising a torch-carriage having rolling supports to bear stably on the surface of the pipe, a sprocket-wheel on the carriage, and a sprocket-chain adapted to be passed about the sprocket-wheel and about the pipe so as to hold the carriage to the pipe.

24. A circumferential pipe cutting or welding machine including a torch carriage; a chain for surrounding the pipe to hold the carriage against the pipe, said chain being extensible by the addition of extra links to accommodate the chain to different sizes of pipe; and a rotary member on the carriage over which the chain passes.

FRANK S. LAWRENCE.